(No Model.)
M. COVEL.
SAW JOINTER AND GAGE.
No. 257,212. Patented May 2, 1882.
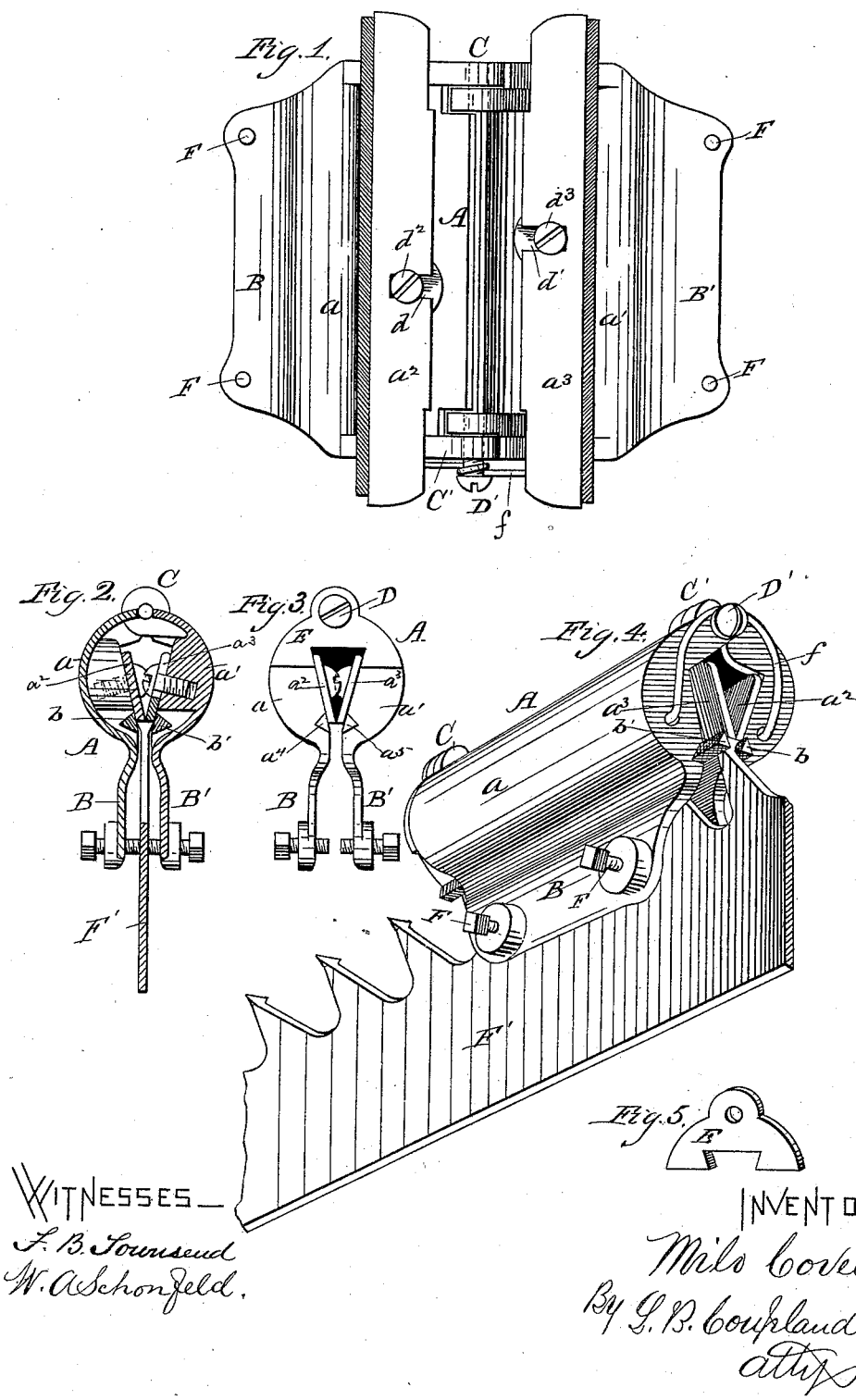
Witnesses
F. B. Townsend
W. A. Schonfeld
Inventor
Milo Covel
By S. B. Coupland & Co
Attys.

UNITED STATES PATENT OFFICE.

MILO COVEL, OF CHICAGO, ILLINOIS.

SAW JOINTER AND GAGE.

SPECIFICATION forming part of Letters Patent No. 257,212, dated May 2, 1882.

Application filed February 20, 1882. (No model.)

*To all whom it may concern:*

Be it known that I, MILO COVEL, of Chicago, in the county of Cook and State of Illinois, have invented certain new and useful Improvements in a Saw Jointer and Gage; and I do hereby declare the following to be a full, clear, and exact description of the invention, that will enable others skilled in the art to which it appertains to make and use the same, reference being had to the accompanying drawings, and to letters of reference marked thereon, forming a part of this specification.

This invention relates to an improvement in jointers for saws, the object being to provide a device that will dress the sides of the teeth of gang and other straight saws uniformly alike, the exact construction and arrangement of which will be hereinafter more fully set forth in detail, and pointed out in the claims.

Figure 1 is an open face view; Fig. 2, a transverse section; Fig. 3, an end elevation; Fig. 4, a side elevation in perspective, and Fig. 5 a detached detail.

Referring to the drawings, A represents the body proper, consisting of the two semicircular parts or halves $a\ a'$, provided with the projecting jaws B B'. These two parts are joined together at the back by means of the lugs C C' and the screws D D' inserted therein, forming a hinged joint, adapting the device to be opened and closed as may be required for the adjustment of the several parts, and when ready for use is folded together in the manner shown in Figs. 2, 3, and 4 of the drawings. The inner faces of the parts $a\ a'$ are cut away, so as to permit the clamping-plates $a^2\ a^3$ to be set at an oblique angle relative to the perpendicular of the body A. The inner faces are also provided with the longitudinal triangular recesses $a^4\ a^5$, providing seats for the reception of the three-cornered files $b\ b'$, the cutting-faces of which are set at an angle corresponding to the clamping-plates $a^2\ a^3$, which serve to retain the files firmly in the proper position. These clamping-plates are provided near their longitudinal center with the rectangular slots $d\ d'$, which permit of a lateral adjustment, and are secured to the parts $a\ a'$ by means of the screws $d^2\ d^3$. These clamping-plates have several different functions: first, they secure the files; second, the lower edges rest upon the point of the teeth, supporting and preventing the jointer from dropping too low on the saw, thus causing each tooth to be dressed just so far from the point; third, they act as a face-guide, marking the longest teeth as the jointer is applied to the saw; and, lastly, the inner edges come in contact with the notched locking-plate E, as shown in Fig. 3 of the drawings, and prevent the device from springing apart beyond a certain point, in accordance with the width of the notch in the locking-plate E, a perspective of which is shown in Fig. 5 of the drawings. This locking-plate is secured to the end of the jointer by one of the screws forming the hinged joint. The clamping-plates $a^2\ a^3$ are so arranged with reference to the files or cutting-face of the same presented to the saw that but one-half bears against the saw at a time, thus getting six cutting-surfaces from each file and reducing this item of expense to the lowest possible minimum.

The set-screws F, inserted in the lower parts of the jaws B B', serve as a guide or gage to impart to the tooth the desired width by adjusting the set-screws accordingly.

Figs. 2 and 4 illustrate the relative position of the jointer when in contact with the saw F'. When the jointer is placed on the saw the files are brought in contact with the same by a pressure of the hand from the operator, the jointer being moved back and forth the length of the saw until the sides are dressed off, leaving the points of the teeth a uniform width. When the pressure from the hand of the operator is relaxed the spring $f$, attached to the end of the jointer, as shown in Fig. 4 of the drawings, forces the parts away from the saw, and the jointer is conveniently removed.

Having thus described my invention, what I claim, and desire to secure by Letters Patent, is—

1. In a saw-jointer, the body A, consisting of the semicircular parts $a\ a'$, hinged together at the back, and having the projecting jaws B B', provided with the set-screws F, and adapted to fold over upon itself, substantially as described.

2. In a saw-jointer, the combination, with the parts $a\ a'$, hinged together at the back, of the clamping-plates $a^2\ a^3$, provided with the rectangular slots $d\ d'$, adapting the same to have a lateral adjustment, substantially as described.

3. In a saw-jointer, the combination, with the parts $a\ a'$, hinged together at the back, of the clamping-plates $a^2\ a^3$, the screws $d^2\ d^3$, and the triangular files $b\ b'$, substantially as described.

4. In a saw-jointer, the combination, with the parts $a\ a'$, of the clamping-plates $a^2\ a^3$ and the notched locking-plate E, substantially as and for the purpose described.

5. In a saw-jointer, the combination, with the parts $a\ a'$, of the spring $f$, substantially as described.

6. In a saw-jointer, the combination, with the parts $a\ a'$, of the clamping-plates $a^2\ a^3$, substantially as described.

MILO COVEL.

Witnesses:
S. A. GOULD,
A. DUNNING.